UNITED STATES PATENT OFFICE.

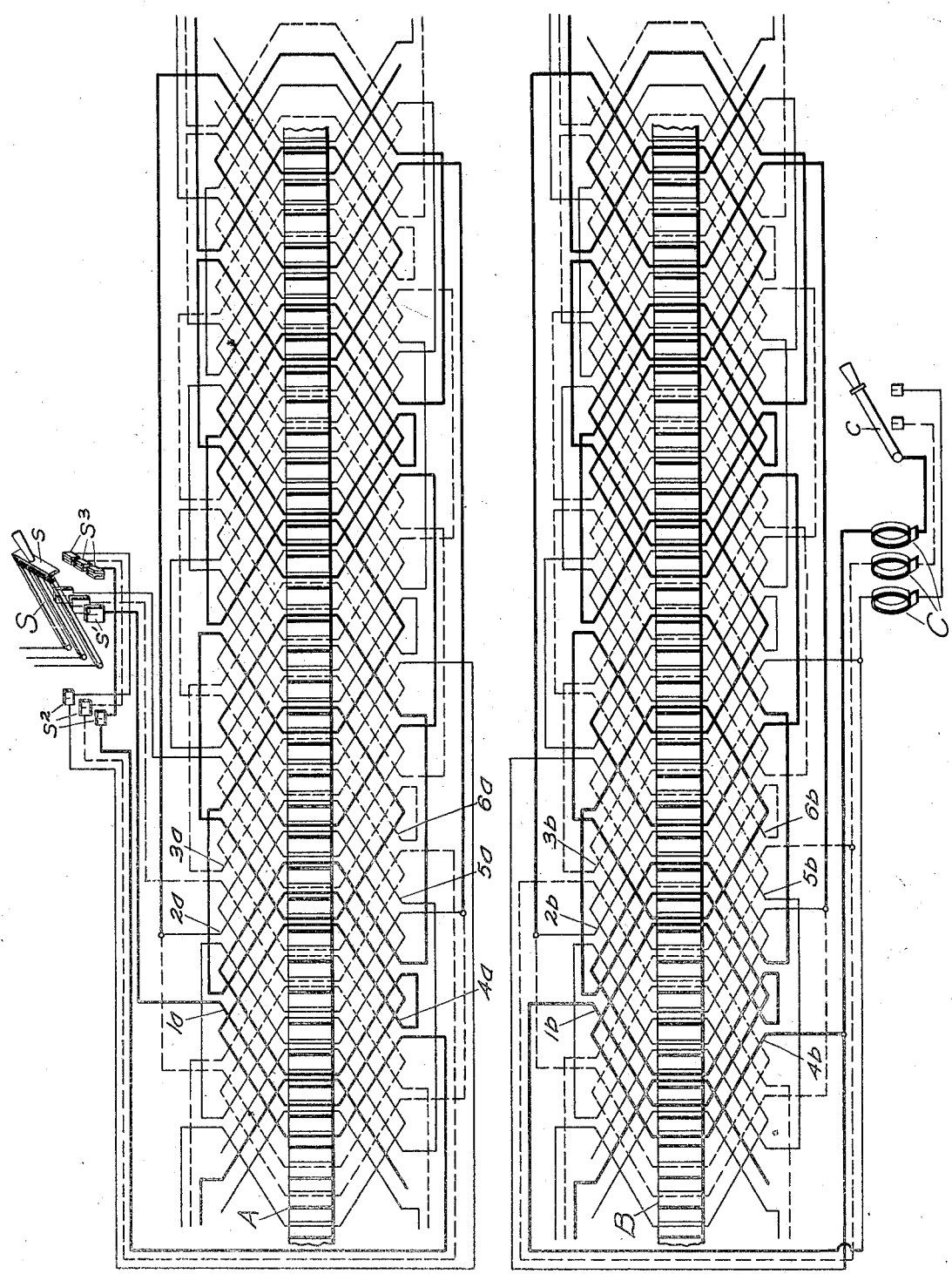

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 897,508.      Specification of Letters Patent.      Patented Sept. 1, 1908.

Application filed October 16, 1905. Serial No. 282,884.

*To all whom it may concern:*

Be it known that I, ERNST F. W. ALEXANDERSON, a subject of the King of Sweden, residing at Schenectady, in the county of Schenectady and State of New York, have invented certain new and useful Improvements in Alternating - Current Motors, of which the following is a specification.

My invention relates to alternating-current motors of the induction type, and its object is to provide a novel and efficient motor capable of operating at a plurality of speeds.

My invention in one aspect consists in providing both the primary and the secondary member with two separate windings of different pole numbers carried on the same portions of said members; the pole numbers of the secondary member corresponding to the pole numbers of the primary member and the two pole numbers being so chosen that a winding of one pole number will not be inductively affected by a winding of the other pole number, and the secondary windings being provided with connections whereby the current induced in one secondary winding may flow through the other. With the motor thus arranged, by connecting one primary winding or the other to the source of current two speeds may be obtained, and by connecting one primary winding to the source and short-circuiting the other primary winding, a third speed is obtained. The operation when the motor is thus connected will be understood by considering the inductive effects of the several windings upon each other. Since the two secondary windings have different pole numbers, the primary winding that is connected to the source can induce current only in the secondary winding having the same number of poles, and this current, supplied from one secondary winding to the other, induces current only in the second primary winding which is short-circuited. The motor consequently acts precisely like two motors connected in concatenation, and the speed of the motor is the same as that of an ordinary motor having a number of poles equal to the sum of the number of poles of the two primary windings.

In order to facilitate making the several connections required, my invention further consists in connecting the two secondary windings in parallel to contact devices and providing means for short-circuiting the contact devices. When the short-circuiting means is opened, the two windings are connected in series,—that is, they are properly connected for operation on the concatenation principle. On the other hand, when the short-circuiting means is closed each secondary winding is short-circuited on itself so that it is properly connected for operation when either primary is connected to the source and the other open-circuited.

While heretofore it has ordinarily been necessary to provide special windings for induction motors designed for three or more speeds, by means of my invention I am enabled to use a type of winding which is in every way standard. In this further aspect my invention consists in winding each member with distributed uniform coils so that both windings, while of different pole-numbers, have the same coil-width, and may consequently be interlaced to form mechanically a single winding in every way identical with a standard single speed induction motor winding. In order to secure the maximum distribution, and consequently the minimum reactance, I so arrange the windings that each slot contains a coil of each winding. In practice I prefer to employ the standard two-coil-per-slot barrel form of winding, one coil in each slot being electrically connected in one winding and the other coil being connected in the other one.

My invention will best be understood by reference to the accompanying drawing, which shows diagrammatically a motor provided with windings and controlling means arranged in accordance with my invention.

In the drawing, A represents the core of the primary member which in practice would ordinarily be the stator, and which would be constructed like the stator of a standard induction motor, which, as is well known in the art, consists of a laminated core slotted to receive the winding. The core A is wound with uniform distribution coils, as shown. The arrangement shown is exactly like the standard type of winding employed with single-speed induction motors, known as the barrel type of winding and arranged with two coils per slot. Electrically, the coils are connected to form two separate three-phase windings of different pole-numbers. The three-phases of one winding are indicated by $1^a$, $2^a$ and $3^a$, respectively, one phase being shown in heavy lines, the second in light lines, and the third in dotted lines. The three phases of the other winding are similarly shown and indicated by 4ª, 5ª and 6ª. In order to avoid confusion, the end connections of one winding are shown on one side of the core and the end connections of the other on the other side of the core. It will be seen that each winding comprises one coil per slot and that each slot contains a coil of both windings, so that the two windings together produce a standard two-coil-per-slot winding. If one phase, such, for instance, as 1ª of the first winding be considered, it will be seen that it is a six-pole winding, while the winding 4ª is a four-pole winding. With these pole numbers the two windings have no inductive effects upon each other. This arrangement of the stator coils so as to form two electrically independent windings interlaced so as to form mechanically a single standard winding, is disclosed and broadly claimed in my former application, Serial No. 274,856, filed August 19, 1905.

B represents the secondary member which would ordinarily be the rotor, and which in practice would consist of the usual laminated drum. The windings are similar in every respect to the primary winding. Each of the two windings corresponds in pole number to one of the primary windings. It will be seen that both primary and secondary members are shown as having the same number of slots. The reason for this is that in order to simplify the drawing the minimum number of slots for a three-phase six-pole winding of one coil per slot was chosen. In practice both primary and secondary members would have a much larger number of slots and the numbers of the slots on the two members would be different as in the usual induction motor practice, so as to avoid the locking tendency that exists when the number of slots in both members are equal.

The two secondary windings are connected in parallel to contact devices such as collector rings C, and a switch $c$ is provided for short-circuiting the collector rings. The three phases of the six-pole primary winding are connected to contacts $s'$ of a three-pole switch S, which is connected to a suitable source of three-phase current, not shown. The other primary winding has its terminals connected to the contact $s^2$ of the switch S, and also to the contacts $s^3$, which are arranged at right angles to the other contacts, and are adapted to be engaged by a short-circuiting blade $s$ carried by the switch S and insulated from the switch blades connected to the source of current.

When the switch S is thrown to the extreme right-hand position, so as to bring the short-circuiting blade $s$ into engagement with the contact $s^3$, the six-pole primary winding is connected to the source of current, while the four-pole primary winding is short-circuited. In this position of the primary switch S the short-circuiting switch $c$ should be open. With the switches in this position the six-pole primary winding induces an electromotive force in the six-pole secondary winding, but has no effect upon the four-pole secondary winding, this latter winding being connected to the terminals of the six-pole secondary winding receives the current which is induced therein and acts as a primary winding to induce current in the short-circuited four-pole winding of the primary member. The motor consequently acts on the concatenation principle and operates at the same speed as though it were connected for ten poles. Now, if the switch S is moved to the position shown, and the short circuiting member $c$ is closed, the four-pole primary winding is open-circuited while the six-pole secondary winding is short-circuited upon itself. The motor consequently acts like an ordinary six-pole induction motor. If the switch S is thrown to the extreme left-hand position, the six-pole primary winding is cut out of circuit and the four-pole primary winding is connected to the source. Since the four-pole secondary winding is short-circuited by the switch $c$ the motor now operates as an ordinary four-pole induction motor. Thus speeds corresponding to ten, six and four poles are obtained without requiring a special winding on either member. The motor would ordinarily be started with the concatenation connection, and it will be observed that with this connection all the copper of both windings is being utilized effectively. The motor, consequently, has the same output at starting and at its lowest speed that a single-speed induction motor of the same weight would have, and it is at starting and on low speeds that all the copper is most needed.

It will be understood that I have illustrated my invention diagrammatically, and that in practice any standard winding and connections may be employed. The simple forms of short-circuiting switches which I have shown may be replaced by controlling switches of any well known type for further regulating the speed and torque, if desired. Accordingly, I do not desire to limit myself to the particular construction and arrangement of parts here shown, but aim in the appended claims to cover all modifications which are within the scope of my invention.

What I claim as new and desire to secure by Letters Patent of the United States, is,

1. In an alternating-current motor, a laminated primary member, two primary windings of different pole numbers both carried on the same part of said member, two secondary windings of corresponding pole numbers, and connections whereby the current induced in one secondary winding may flow through the other.

2. In an alternating-current motor, a laminated primary member, two primary windings of different pole numbers both carried on the same part of said member, two secondary windings of corresponding pole numbers, contact devices to which both of said secondary windings are connected, and a short-circuiting switch coöperating with said contact devices.

3. In an alternating-current motor, a laminated primary member, two primary windings of different pole numbers carried on the same part of said member, two secondary windings of corresponding pole numbers, connections whereby the current induced in one secondary winding may flow through the other, and means for connecting one of said primary windings to a source of alternating-current and short-circuiting the other.

4. In an alternating-current motor, a laminated primary member, two primary windings of different pole numbers carried on the same part of said member, two secondary windings of corresponding pole numbers, contact devices to which both of said secondary windings are connected, means for connecting either primary winding to a source of alternating-current, means for short-circuiting one primary winding, and means for short-circuiting said contact devices.

5. In an alternating-current motor, a laminated primary member, two primary windings of different pole numbers carried on the same part of said member, two secondary windings of corresponding pole numbers, means for connecting one primary winding to a source of alternating-current and short-circuiting the other, connections between the two secondary windings whereby the current induced in one is supplied to the other, and means for short-circuiting each of the secondary windings.

6. In an alternating-current motor, a primary member wound with distributed coils all of the same width electrically connected to form two separate windings of different pole numbers, a secondary member also wound with distributed coils all of the same width electrically connected to form two separate windings of pole numbers corresponding to the two primary windings, and means for connecting either primary winding to a source of alternating-current.

7. In an alternating-current motor, a slotted primary member wound with distributed coils all of the same width electrically connected to form two separate windings of different pole numbers, each slot containing a coil of both windings, a slotted secondary member similarly wound, the pole numbers corresponding to the pole numbers of the primary winding, and means for connecting either primary winding to a source of current.

8. In an alternating-current motor, a primary member wound with uniform distributed coils of different pole numbers, a secondary member similarly wound, the secondary pole numbers corresponding to the primary, contact devices to which both of said secondary windings are connected, means for short-circuiting said contact devices, and means for connecting either primary winding to a source of alternating-current.

9. In an alternating-current motor, a slotted primary member wound with uniform distributed coils electrically connected to form two separate windings of different pole numbers, each slot containing a coil of both windings, a slotted secondary member similarly wound, the pole numbers corresponding to the pole numbers of the primary winding, contact devices to which both of said secondary windings are connected, means for short-circuiting said contact devices, and means for connecting either primary winding to a source of alternating current.

10. In an alternating-current motor, a primary member wound with uniform distributed coils electrically connected to form two separate windings of different pole numbers, a secondary member similarly wound, the secondary pole numbers corresponding to the primary, means for connecting one primary winding to a source of alternating current and short-circuiting the other, connections between the secondary windings whereby the current induced in one is supplied to the other, and means for short-circuiting the secondary windings.

11. In an alternating-current motor, a slotted primary member wound with uniform distributed coils, electrically connected to form two separate windings of different pole numbers, each slot containing a coil of both windings, a slotted secondary member similarly wound, the pole numbers corresponding to the pole numbers of the primary winding, means for connecting one primary winding to a source of current and short-circuiting the other, connections between the secondary windings whereby the current induced in one is supplied to the other, and short circuiting means in circuit with the secondary windings.

12. In an alternating-current motor, a primary member wound with uniform distributed coils of different pole numbers, a secondary member similarly wound, the secondary pole numbers corresponding to the primary, contact devices to which both of said secondary windings are connected, means for connecting either primary winding to a source of alternating-current, means for short-circuiting one primary winding, and means for short-circuiting said contact devices.

13. In an alternating-current motor, a slotted primary member wound with uniform distributed coils electrically connected to form two separate windings of different pole numbers, each slot containing a coil of both windings, a slotted secondary member similarly wound, the pole numbers corresponding to the pole numbers of the primary winding, contact devices to which both of said secondary windings are connected, means for connecting either primary winding to a source of alternating current, means for short-circuiting one primary winding, and means for short-circuiting said contact devices.

In witness whereof, I have hereunto set my hand this 13th day of October, 1905.

ERNST F. W. ALEXANDERSON.

Witnesses:
   BENJAMIN B. HULL,
   HELEN ORFORD.